(12) United States Patent
Mun

(10) Patent No.: US 8,606,550 B2
(45) Date of Patent: Dec. 10, 2013

(54) AUTOECONOMETRICS MODELING METHOD

(76) Inventor: Johnathan C. Mun, Pleasanton, CA (US)

( * ) Notice: Subject to any disclaimer, the term of this patent is extended or adjusted under 35 U.S.C. 154(b) by 594 days.

(21) Appl. No.: 12/378,168

(22) Filed: Feb. 11, 2009

(65) Prior Publication Data

US 2010/0204967 A1   Aug. 12, 2010

(51) Int. Cl.
*G06F 7/60* (2006.01)
*G06G 7/48* (2006.01)

(52) U.S. Cl.
USPC .................................. 703/2; 703/6

(58) Field of Classification Search
USPC .............................. 703/2; 705/10, 14.52, 348
See application file for complete search history.

(56) References Cited

U.S. PATENT DOCUMENTS

| | | | |
|---|---|---|---|
| 6,473,084 B1 * | 10/2002 | Phillips et al. | 345/440 |
| 6,493,682 B1 * | 12/2002 | Horrigan et al. | 705/36 R |
| 6,606,615 B1 * | 8/2003 | Jennings et al. | 706/45 |
| 7,062,447 B1 | 6/2006 | Valentine | |
| 7,072,863 B1 * | 7/2006 | Phillips et al. | 705/36 R |
| 7,167,837 B1 * | 1/2007 | Ciampi et al. | 705/35 |
| 7,860,770 B2 * | 12/2010 | Ciampi et al. | 705/35 |
| 8,156,027 B1 * | 4/2012 | Haddad et al. | 705/35 |
| 2003/0182224 A1 * | 9/2003 | Horrigan et al. | 705/37 |
| 2004/0059518 A1 * | 3/2004 | Rothschild | 702/18 |
| 2004/0172355 A1 * | 9/2004 | Pandher | 705/37 |
| 2004/0230470 A1 | 11/2004 | Svilar et al. | |
| 2005/0187851 A1 | 8/2005 | Sant | |
| 2006/0010060 A1 | 1/2006 | Jones et al. | |
| 2006/0149503 A1 * | 7/2006 | Minor | 702/179 |
| 2006/0161403 A1 * | 7/2006 | Jiang et al. | 703/2 |
| 2007/0016542 A1 | 1/2007 | Rosauer et al. | |
| 2007/0078746 A1 * | 4/2007 | Ciampi et al. | 705/36 R |
| 2008/0235154 A1 | 9/2008 | Jones et al. | |

OTHER PUBLICATIONS

Keng, Tan Yen "An Hedonic Model for House Prices in Malaysia", 2004.*
Fomby, Tom. "Multiple Linear Regression and Subset Selection", Feb. 4, 2008.*
EViews 6 User's Guide, Sep. 2007.*
Karim, Mohammad. "Selection of the Best Regression Equation by sorting out Variables", 2004.*
Sykes, Alan. "An Introduction to Regression Analysis", 1999.*
Croissant et al. "Panel Data Econometrics in R: The plm Package", 2012.*
"Multiple Regression—Selecting the Best Equation", 2001.*
"Specification: Choosing the Independent Variables", 2006.*
Johnathan Mun, "Advanced Analytical Models", Jun. 2008, [pp. 239-286, 693-715, Appendices C, E, G], Wiley Finance, New Jersey, USA.

* cited by examiner

*Primary Examiner* — Shambhavi Patel
(74) *Attorney, Agent, or Firm* — James M Smedley LLC; James M. Smedley, Esq.

(57) ABSTRACT

A method and system allowing the ability to automatically and systematically run thousands and even millions of combinations and permutations of regression, forecasting and econometric trials to determine the best-fitting predictive model.

16 Claims, 7 Drawing Sheets

FIGURE 1

AUTOECONOMETRICS

The Autoeconometrics module applies some intelligent heuristics and algorithms to scan all of your independent variables (X) to determine the best-fitting econometric and regression model that best explains the dependent variable (Y).

Dependent Variable [ Y ▶ ]

| Y | X1 | X2 | X3 | X4 | X5 |
|---|---|---|---|---|---|
| 521 | 18308 | 185 | 4.041 | 79.6 | 7.2 |
| 367 | 1148 | 600 | 0.55 | 1 | 8.5 |
| 443 | -180 | 372 | 3.665 | 32.3 | 5.7 |
| 365 | -772 | 142 | 2.351 | 45.1 | 7.3 |
| 614 | -1004 | 432 | 29.76 | 190.8 | 7.5 |
| 385 | 16275 | 290 | 3.294 | 31.8 | 5 |
| 286 | 14630 | 346 | 3.287 | 678.4 | 6.7 |
| 397 | 4008 | 328 | 0.657 | 340.8 | 6.2 |
| 764 | 39827 | 354 | 12.395 | 238.6 | 7.3 |
| 427 | 22322 | 226 | 6.478 | 111.9 | 5 |

OPTIONS
- ☐ Linear & Nonlinear
- ☐ Time-Series Lags   [ 1 ◆ ] Periods
- ☐ Autoregressive Lags [ 1 ◆ ] Periods
- ☐ Linear & Nonlinear Interacting Analysis          [ Enumeration ▶ ]  — 007
P-Value Threshold [ 0.1000 ]          — 008
Y Type            [ Dependent Y ▶ ]  — 009

[ OK ]  [ Cancel ]

FIGURE 2

```
//Sample Enumaration Software
Code in C++ Script include <iostream>
include <fstream>
#include <string>
#include <math.h>
using namespace std;
using std::string;
int main()
{
    int i,j,k,r,b,h;
    ifstream myfile;
    myfile.open
("7v_1to7new.txt");
//  myfile.open ("sorted.txt");
    ofstream
f1("7v_5terms.txt",ios::app);
    ofstream
f2("7v_6terms.txt",ios::app);
    int count;
        string line[756];
        int index=0;
        string temp;
        for (int m=0;m<756;m++)
        {
            getline(myfile,temp);
            line[index]=temp;
            index=index+1;
        }
        cout<<line[755];
myfile.close();
for(i=0;i<12;i++)
{
    for (j=i+1;j<16; j++)
    {
        for
(k=j+1;k<20; k++)
        {
            for (r=k+1;r<24; r++)
            {
                for (b=r+1;b<28; b++)
                {
                    for (h=b+1;h<196; h++)
                    {
                        int
count1,count2,count3,count4,co
unt5,count6,count7,count8,count
9,count0;
                        count1=count2=count3=count4=
count5=count6=count7=count8=
count9=count0=0;
                        int cn = 0;
                        // number of 'N' in the combined
string
                        int cl = 0;
                        int cx=0;
                        string
str=line[i]+line[j]+line[k]+line[r]+li
ne[b]+line[h];
                        int length=
strlen(str.c_str());
                        for (int p = 0; p<length;
p++)
                        {
                            switch (str[p])
                            {
                                case 'N':
                                    {cn++;
                                    break;}
                                case 'L':
                                    {cl++;
                                    break;}
                                case 'X':
                                    {cx++;
                                    break;}
                                case '1':
                                    {count1++;
                                    break;}
                                case '2':
                                    {count2++;
                                    break;}
                                case '3':
                                    {count3++;
                                    break;}
                                case '4':
                                    {count4++;
                                    break;}
                                case '5':
                                    {count5++;
                                    break;}
                                case '6':
                                    {count6++;
                                    break;}
                                case '7':
                                    {count7++;
                                    break;}
                                case '8':
                                    {count8++;
                                    break;}
                                case '9':
                                    {count9++;
                                    break;}
                                case '0':
                                    {count0++;
                                    break;}
                            }
                        }
```

FIGURE 5

RESULTS

059 — Auto Econometrics
Number of Econometric Models Tested: 2373340
Number of Best Models Shown: 20
Summary of Top Models:

| ADJ R-SQ | MODEL |
|---|---|
| 0.999966 | VAR1*VAR2*VAR3;VAR4;LAG(VAR5,1);LN(LAG(VAR6,1)) |
| 0.999966 | VAR1*VAR2*VAR3;VAR4;LAG(VAR5,1);LAG(VAR6,1) |
| 0.999965 | VAR1*VAR2*VAR3;VAR4;LAG(VAR5,1) |
| 0.999963 | VAR1*VAR2*VAR3;LAG(VAR5,1) |
| 0.999963 | VAR1*VAR2*VAR3;LAG(VAR5,1)*VAR6 |
| 0.999963 | VAR1*VAR2*VAR3;LAG(VAR5,1);LN(LAG(VAR6,1)) |
| 0.999963 | VAR1*VAR2*VAR3;LN(LAG(VAR6,1));LAG(VAR5,1) |
| 0.999963 | VAR1*VAR2*VAR3;LN(VAR4);LAG(VAR5,1);LN(LAG(VAR6,1)) |
| 0.999963 | VAR1*VAR2*VAR3;LN(VAR4);LAG(VAR5,1);LAG(VAR6,1) |
| 0.999963 | VAR1*VAR2*VAR3;LAG(VAR5,1);LAG(VAR6,1) |

Detailed Top Model Results:
MODEL: VAR1*VAR2*VAR3;VAR4;LAG(VAR5,1);LN(LAG(VAR6,1))
R-Squared (Coefficient of Determination): 0.999972
Adjusted R-Squared: 0.999966
Multiple R (Multiple Correlation Coefficient): 0.999986
Standard Error of the Estimates (SEy): 318.694450
Number of Observations: 26.000000

Regression Results
Intercept
 Coefficients    = : 477.728299
 Standard Error = : 821.357818
 t-Statistic     = : 0.581632
 p-Value         = : 0.567006
 Lower 5%        = : -1230.378784
 Upper 95%       = : 2185.835383
VAR1*VAR2*VAR3;VAR4;LAG(VAR5,1);LN(LAG(VAR6,1))
 Coefficients    = : 0.000010
 Standard Error = : 0.000000
 t-Statistic     = : 174.350739
 p-Value         = : 0.000000
 Lower 5%        = : 0.000010
 Upper 95%       = : 0.000010
VAR1*VAR2*VAR3;VAR4;LAG(VAR5,1);LN(LAG(VAR6,1))
 Coefficients    = : -92.428055
 Standard Error = : 53.114323
 t-Statistic     = : -1.740172
 p-Value         = : 0.096465
 Lower 5%        = : -202.885336
 Upper 95%       = : 18.029226
VAR1*VAR2*VAR3;VAR4;LAG(VAR5,1);LN(LAG(VAR6,1))

FIGURE 6

SAMPLE AUTOECONOMETRICS RESULTS REPORT

Auto Econometrics Analysis Reports

Regression Statistics

| | |
|---|---|
| R-Squared (Coefficient of Determination) | 0.4514 |
| Adjusted R-Squared | 0.4156 |
| Multiple R (Multiple Correlation Coefficient) | 0.6719 |
| Standard Error of the Estimates (SEy) | 132.1810 |
| Number of Observations | 50 |

| | Intercept | time | ln(var2) | ln(var3) |
|---|---|---|---|---|
| Coefficients | -430.3626 | -2.8415 | 135.4118 | 79.1241 |
| Standard Error | 334.4569 | 1.3388 | 59.5221 | 19.0852 |
| t-Statistic | -1.2868 | -2.1225 | 2.2750 | 4.1458 |
| p-Value | 0.2046 | 0.0392 | 0.0276 | 0.0001 |
| Lower 5% | -1103.5896 | -5.5363 | 15.6000 | 40.7077 |
| Upper 95% | 242.8643 | -0.1467 | 255.2236 | 117.5405 |

Degrees of Freedom

| | | Hypothesis Test | |
|---|---|---|---|
| Degrees of Freedom for Regression | 3 | Critical t-Statistic (99% confidence) | 2.6870 |
| Degrees of Freedom for Residual | 46 | Critical t-Statistic (95% confidence) | 2.0129 |
| Total Degrees of Freedom | 49 | Critical t-Statistic (90% confidence) | 1.6787 |

Analysis of Variance

| | Sums of Squares | Mean of Squares | F-Statistic | p-Value |
|---|---|---|---|---|
| Regression | 661359.68 | 220453.23 | 12.62 | 0.0000 |
| Residual | 803704.00 | 17471.83 | | |
| Total | 1465063.68 | | | |

WORD DESCRIPTIONS OF RESULTS ns in the independent variables. In other words, if the
R-square in a sample regression model is 0.75, then 75%

AUTOECONOMETRICS MODELING METHOD

COPYRIGHT AND TRADEMARK NOTICE

A portion of the disclosure of this patent document contains materials subject to copyright and trademark protection. The copyright and trademark owner has no objection to the facsimile reproduction by anyone of the patent document or the patent disclosure, as it appears in the U.S. Patent and Trademark Office patent files or records, but otherwise reserves all copyrights whatsoever.

BACKGROUND OF THE INVENTION

The present invention is in the field of finance, economics, forecasting, math, general analytics and business statistics, and relates to modeling of business and financial variables. Traditionally, analysts have used methods such as multiple regression analysis to model the behavior of certain variables. For example, how much sales revenues will be generated by a firm if they spend a certain amount in marketing, hire these many people, if the economy is on a downturn, and if general prices are at a certain level (e.g., a best-fitting regression equation can be generated like Sales=$10 Million+2.1×Marketing Expenses in $Millions, which means that for every additional million dollars spent on marketing expenses, the company will generate an additional $2.1 million, and so forth). When historical data exists, the analyst can use regression analysis to model and determine the best-fitting equation to help forecast, predict, and model the behavior of these variables. Regression analysis can be used in any application, from business and economics to finance and engineering, as well as the social and physical sciences. The idea behind regression analysis is to determine the equation that is the best-fitting model given a set of data. The problem is that regression analysis can be a very difficult field to master. In fact, the depth of regression analysis can be fairly intimidating and can reach the heights of an advanced doctoral degree. This detailed and advanced study of regression analysis is termed econometrics.

The basic regression analysis methods has been applied in many industries and settings, and are widely taught at universities. Econometrics, in contrast, is an area of study that is very specialized. To illustrate, the most basic tests in econometrics bear intimidating names (and equally intimidating and intractable mathematical expressions) such as multicollinearity, micronumerosity, impulse response function, autoregressive integrated moving average, asymmetrical generalized autoregressive conditional heteroskedasticity, and many others. To the regular analyst, such methods would be intractable and often times unused, albeit their power and value of these models provide will far surpass anything that can be done manually. The present invention is named Autoeconometrics, which is the business process method used to test thousands and millions of model combinations and permutations to find the best-fitting equation. As the field of econometrics is wide-ranging, there are certain other methods with similar sounding names as Autoeconometrics but are completely different methods and approaches. Terms like autocorrelation and autoregression are very different. Autocorrelation refers to a set of data that is correlated to itself (e.g., sales in January are related to sales in December, which are related to the sales the previous month) and autoregressive models are used to test and model data that exhibit autocorrelation. Autocorrelation is an observation that data is correlated to itself in the past, autoregression (a.k.a. autoregressive) is the model used to model autocorrelation. Clearly this is very different from the Autoeconometrics described in this document, which is a business process method to find the best-fitting model, and one of these variables might be an autoregressive model.

This document details the invention of a business process technique called Autoeconometrics whereby thousands and even millions of different model combinations are automatically tested in a specialized algorithm with its preferred embodied as a software application module. This process and method automatically runs through many econometric variations using a sophisticated set of computer algorithms and business processes to determine the best-fitting equation or model that best explains the data under analysis.

SUMMARY OF THE INVENTION

Autoeconometrics runs when the user selects some data or enters in some data in the algorithm, and identifies which data variables would be the independent variables and which is the dependent variable. A dependent variable is also termed the "Y" variable, which depends on other variables, hence the name dependent variable. Examples of this variable include the aforementioned sales revenues, which depends on how well the economy is doing, the marketing expenses, price levels, and so forth. These latter variables are deemed independent variables, also denoted as the "X" variables. The algorithm then proceeds by looking at all possible combinations of these Y and X variables by modifying the original data into various forms, including taking the logarithm, natural logarithm, lag, squared, raised to a different power, division, multiplication, and many other arithmetic combinations. Then, the algorithm runs each of these generated intermediate variables using regression analysis and econometric techniques. The process is repeated thousands and even millions of times in memory. The list of best-fitting models chosen based on econometric and statistical criteria will be returned to the user. Using such an algorithm, a process that manually can take many months or years can be done in a matter of a few minutes to a few hours, depending on the computer capacity, the number of X variables and the amount of data present.

The Autoeconometrics business process algorithm in the present invention comprises two different varieties. The first is the process called Detailed Enumeration. This enumeration process simply lists all possible combinations and permutations of data, variables, and models that can be run, and each of these models will be run in the algorithm. Clearly this approach will be exhaustive and requires significant computing resources and time, but the results are more accurate, detailed and covers all possible outcomes. The second approach is the Quick Heuristics method, whereby a smart search heuristic or algorithm is applied to obtain very similar answers as the detailed enumeration approach would, but takes a lot less computer resources and time. Sometimes, the heuristics approach may not obtain the best and most optimal results, but in most cases, even suboptimal results will be sufficient, especially when the user has significant amounts of data. Using the enumeration method to list and run millions upon millions of combinations will be too cumbersome for practical applications.

In any regression analysis and basic econometric model, there are several sets of results that are critical. These are the standard set of results including the R-square (also known as the coefficient of determination, ranging between 0% and 100%, where this value indicates the percentage of variation in the dependent variable that can be explained by the variations in the independent variables together in the model) where this R-square is a measure of the goodness of fit of the model—the higher the value, the better and more accurate the model. Also, the adjusted R-square is included in the results. This result simply adjusts the original R-square for adding additional independent variables that may end up being not statistically significant, thereby confounding the model with erroneous variables. This adjusted R-square is hence a better measure of the goodness of fit of the model. The other critical set of results for testing if the model is a good fit is the p-value. Statistically speaking, the smaller the p-value, the more significant an independent variable is in predicting the dependent variable. Using these two criteria, the R-square (or adjusted R-square) and the p-value, we can then apply the Autoeconometrics procedure and use these two values as the selection and ranking criteria for finding the best equation.

The related art is represented by the following references of interest.

U.S. Pat. No. 7,062,447 issued to Suzanne Valentine, et al on Jun. 13, 2006 describes the modeling of the relevant price levels to charge customers and the corresponding quantity that will be sold by applying some basic econometrics analysis, through the cleaning up of some existing raw data (for any data and variable errors and inconsistencies), and then runs some econometric analysis. The Valentine application includes looking at stockpiling of inventory, sales and marketing promotional effects on pricing and quantity sold and general data error identification and correction. Therefore, the Valentine application is irrelevant to the claims of the present invention in that the Valentine application does not illustrate how to run an autoeconometric algorithm and routine whereby thousands and even millions of new variables and data sets are generated from a much smaller data and variable set, and how this larger set of variables are iteratively run such that only the best-fitting econometric model remains.

U.S. Pat. No. US 2007/0016542 A1 issued to Matt Rosauer, et al on Jan. 18, 2007 describes the method of pre-processing existing data to identify patterns in the data and is specific for insurance and property casualty applications for the purposes of insurance underwriting. The pattern recognition approach used is to look at lots of existing raw data and creating groupings such as weather, demographic, geographic, legal, property locations, industry, short-term and long-term insurance policies, and so forth, and screening as well as filtering the data for specific groups to find patterns related to the data. Therefore, the Rosauer application is irrelevant to the claims of the present invention in that the Rosauer application does not illustrate how to run an autoeconometric algorithm and routine whereby thousands and even millions of new variables and data sets are generated from a much smaller data and variable set, and how this larger set of variables are iteratively run such that only the best-fitting econometric model remains.

U.S. Pat. No. US 2008/0235154 A1 issued to Christopher L. Jones, et al on Sep. 25, 2008 describes a financial advisory system for retirement planning and looks at different investments and assets and identifying their respective risk levels and deciding which of these assets should be held in a portfolio. The Jones application uses a basic econometric equilibrium model, which is a known and single econometric model that is very specific to the retirement planning application and is not used or claimed in the present invention. Therefore, the Jones application is irrelevant to the claims of the present invention in that the Jones application does not illustrate how to run an autoeconometric algorithm and routine whereby thousands and even millions of new variables and data sets are generated from a much smaller data and variable set, and how this larger set of variables are iteratively run such that only the best-fitting econometric model remains.

U.S. Pat. No. US 2005/0187851 A1 issued to Rajiv Raymond Sant, et al on Aug. 25, 2005 describes a general purpose modeling tool for valuation of financial securities like bonds, loans, leases, portfolios of investment and others, and employs some basic econometrics analysis but these methods are not relevant to the present invention. This method is simply a series of pre-computed and known mathematical models and equations that require some predefined inputs and the outputs are computed based on predefined financial and mathematical valuation models, including the ability to screen stocks and bonds for specific characteristics such as the percentage return in the past few years, analyzing loans and selecting portfolios of investments. Therefore, the Sant application is irrelevant to the claims of the present invention in that the Sant application does not illustrate how to run an autoeconometric algorithm and routine whereby thousands and even millions of new variables and data sets are generated from a much smaller data and variable set, and how this larger set of variables are iteratively run such that only the best-fitting econometric model remains.

U.S. Pat. No. US 2006/0010060 A1 issued to Christopher L. Jones, et al on Jan. 12, 2006 describes a method used to generate different scenarios of potential outcomes in the future of certain investment assets, specifically for financial advisory applications for retirement funding analysis. This method runs different scenarios of what the economic and financial conditions may become in the new future using an equilibrium econometric model, in order to determine what the best asset-allocation-mix for a retirement portfolio might be. This is a single known econometric model and is very specific in its application, and is not relevant to the present invention. Therefore, the Jones application is irrelevant to the claims of the present invention in that the Jones application does not illustrate how to run an autoeconometric algorithm and routine whereby thousands and even millions of new variables and data sets are generated from a much smaller data and variable set, and how this larger set of variables are iteratively run such that only the best-fitting econometric model remains.

U.S. Pat. No. US 2004/0230470 A1 issued to Michael Svilar, et al on Nov. 18, 2004 describes a general marketing forecasting tool that applies some basic econometrics for determining forecast errors for marketing purposes. This method is used to forecast market demand to identify why a certain product line might have such large forecast errors and to correct for these forecast errors, and takes into account the level of marketing, sales, promotion and other marketing activities in trying to reduce the forecast errors. It uses some basic econometric methods to determine the effects of promotional and marketing effects on consumer demand and shipment of products. Therefore, the Svilar application is irrelevant to the claims of the present invention in that the Svilar application does not illustrate how to run an autoeconometric algorithm and routine whereby thousands and even millions of new variables and data sets are generated from a much smaller data and variable set, and how this larger set of variables are iteratively run such that only the best-fitting econometric model remains.

BRIEF DESCRIPTION OF THE DRAWING

FIG. 01 illustrates the preferred embodiment of the business process algorithm, where the Autoeconometrics method can be run.

FIG. 02 illustrates the combinatorial enumeration code for a sample of seven X variables.

FIG. 05 illustrates a sample of the results after running 237,334 model combinations and permutations on a set of data and its corresponding results.

FIG. 06 illustrates the detailed report from the Autoeconometrics methodology.

DETAILED DESCRIPTION OF THE INVENTION

Figure 3:
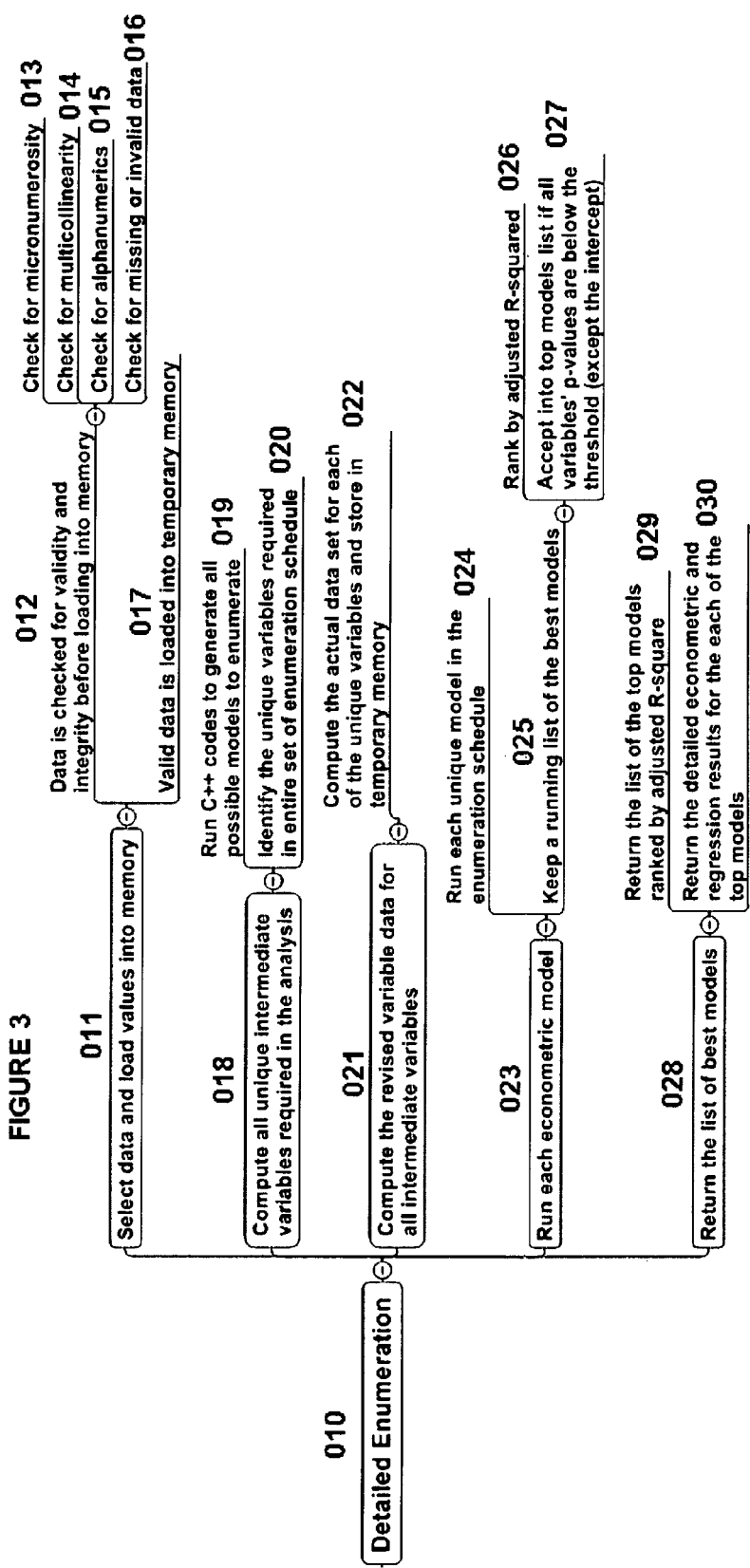
FIG. 03 illustrates the detailed enumeration process, indicating the step by step approach in generating all possible combinations and permutations of variables and models to test, illustrated as a mind map, indicating all of the branched processes.

FIG. 01 illustrates the preferred embodiment of the present invention within a software module where the user would be able to choose the dependent variable 001 from the dataset he or she entered into the data grid 002. This data can be copied and pasted, manually entered or linked from an existing spreadsheet or database. In this user interface, the user then decides if only linear and nonlinear models 003 will be run, whether to add some time-series lags 004 or autoregressive lags 005. Further, linear and nonlinear interacting models 006 can also be tested (each of these functional forms will be discussed in more detail in the following few paragraphs). The more selections made, the more models will be tested and the more computer resource intensive the analysis will be. The user can also choose to either use the detailed enumeration approach or the quick heuristics approach 007. A threshold p-value 008 can also be selected to determine what the statistical cut-off level should be when performing the search algorithm (the default value is 0.1000 and user can enter any value between 0.0001 and 1.0000 inclusive, and zero value is not allowed, whereby if any variable's p-value is above this threshold, it will be a candidate for elimination in the procedure). Finally, the dependent Y variable itself can be subject to modification 009, from being taken as-is or lagged, differenced, or if a logarithm is first applied. The following details the quick heuristics algorithm that is run depending on what is selected in this user interface.

If only "Linear and Nonlinear Models" is checked to make sure that the number of rows of data the user has selected has to be: Rows>2*Columns+2. Otherwise we return the error message.

Here are the additional data requirements:
"Linear and Nonlinear Models":
Rows>2*Columns+2
"Time-Series Lags":
Rows>5*Columns+5
"Linear and Nonlinear Models", "Time-Series Lags":
Rows>7*Columns+7
"Linear and Nonlinear Interacting":
Rows>2(Columns!/(2!*(Columns−2)!))
"Linear and Nonlinear Interacting", "Time-Series Lags":
Rows>5*Columns+5+2(Columns!/(2!*(Columns−2)!))
"Linear & Nonlinear Interacting", "Linear & Nonlinear":
Rows>2*Columns+2+2(Columns!/(2!*(Columns−2)!))

All three selected:
Rows>7*Columns+7+2(Columns!/(2!*(Columns−2)!))

Using user's data, we take these X variables and create in memory: $LN(X_i)$, $LAG(X_i,N)$, $LN(LAG(X_i,N))$, $DIFF(X_i)$, $RATE(X_i)$ and the cross products $X_iX_j$. Where $LN(X_i)$ is the natural logarithm of some variable $X_i$. While $LAG(X_i, N)$ is lag of the variable $X_i$ for N periods. $DIFF(X_i)$ is the first difference (i.e., the new value at period 2 is period 2's X value less period 1's X value). $X_i*X_j$ is variable $X_i$ times variable $X_j$. And $RATE(X_i)$ is the first level ratio (i.e., the new value at period 2 is period 2's X value divided by period 1's X value).

We then run the analysis:
i. Run the basic econometrics routines using Y on all these X variables created.
ii. Then, look at the list of p-values and we take out the variable with the highest p-value (as long as it is above the user input P-Value Threshold) and rerun the analysis without this variable. The intercept's p-value is not considered.
iii. Continue running and eliminating each variable one at a time until all remaining variables have p-values under or at this threshold.
iv. Report the results of the final model where all p-values are under this threshold.
v. When running the analysis, here are some things to make the run go faster:
 a. Take all the Y and X values into memory.
 b. In memory, create new variables such as LN(Xi), LAG (Xi), DIFF(Xi), RATE(Xi) and so forth, based on the list generated previously.
 c. If the original variable has negative values, we do not do the LN for this variable. The same applies when XiXj is negative, we do not compute the LN for it.
 d. When running, we only need the p-values in memory. So, there is no need to run entire econometrics routine and this will make things run faster.
 e. We only show the detailed report of the final result.
 f. If there is a problem when running the econometrics analysis when starting the first model with all the variables, we do a bypass procedure:
  i. If error exists when running all of the variables the first time, skip and do this: Calculate the correlation between Y and each of the X variables, i.e., Correlation of Y to $X_1$, Y to $X_2$, Y to $X_n$. Then, eliminate the lowest absolute value of the correlation. So, if the lowest is variable $X_n$, we eliminate this and then run the econometrics analysis and repeat this step if required.
vi. If user selects the checkbox for Autoregressive AR(p) and puts in some value (only positive integers are allowed and by default this is set to 1 and unchecked), we simply add in the list of functions the value LAG(Y,N) where we lag the Y dependent variable at N number of periods. This N periods is user's AR(p) value entered.
vii. At the bottom of the user interface, we have a droplist where we have:
 a. Dependent (Y): this just means we use the regular Y data selected by user.
 b. LN(Y) Dependent: we take the LN(Y) as the dependent variable when running the analysis.
 c. DIFF(Y) Dependent: we take the difference in Y, i.e., DIFF(Y) at period 2 is Y at period 2 less Y at period 1.
 d. RATE(Y) Dependent: we take the rate ratio in Y, i.e., DIFF(Y) period 2 is Y at period 2 divided by Y at period 1.

If we have for example, three variables that the user links in, X1, X2 and X3, we want to get all the combinations such that it includes TIME, the original variables, the LN of these variables, the LAG of these variables, LN of the LAGS, DIFF of the variables, and the combinatorial multiplication of these variables (two at a time). See below for a simple example.

If there are three variables X1, X2, X3, the combinations list is:
TIME, X1; X2; X3; LN(X1); LN(X2); LN(X3); LAG(X1,N); LAG(X2,N); LAG(X3,N); LN(LAG(X1,N)); LN(LAG (X2,N)); LN(LAG(X3,N)); DIFF(X1); DIFF(X2); DIFF (X3); RATE(X1); RATE(X2); RATE(X3); LN(RATE (X1)); LN(RATE(X2)); LN(RATE(X3)); X1*X2; X1*X3; X2*X3; LN(X1*X2); LN(X1*X3); LN(X2*X3)

And possibly adding two additional variables: LAG(Y,N) and LN(LAG(Y,N) if Autoregressive AR(p) is chosen.

If five variables X1, X2, X3, X4, X5, the combinations list is:
TIME: X1; X2; X3; X4; X5; LN(X1); LN(X2); LN(X3); LN(X4); LN(X5); LAG(X1,N); LAG(X2,N); LAG(X3, N); LAG(X4,N); LAG(X5,N); LN(LAG(X1,N)); LN(LAG(X2,N)); LN(LAG(X3,N)); LN(LAG(X4,N)); LN(LAG(X5,N)); DIFF(X1); DIFF(X2); DIFF(X3); DIFF (X4); DIFF(X5); RATE(X1); RATE(X2); RATE(X3); RATE(X4); RATE(X5); LN(RATE(X1)); LN(RATE (X2)); LN(RATE(X3)); LN(RATE(X4)); LN(RATE(X5)); X1*X2; X1*X3; X1*X4; X1*X5; X2*X3; X2*X4; X2*X5; X3*X4; X3*X5; LN(X1*X3); LN(X1*X4); LN(X1*X5); LN(X2*X3); LN(X2*X4); LN(X2*X5); LN(X3*X4); LN(X3*X5); LN(X4*X5)

And possibly adding two additional variables: LAG(Y,N) and LN(LAG(Y,N) if Autoregressive AR(p) is chosen As a quick check, the total number of variables on each list is $[7*X+1]+2(X!/(2!*(X-2)!))$ so, in the case of 5x variables, we have $7*5+1+2(5!/(2!*(5-2)!))=35+1+20=56$ combinations. That is, the 7*5+1 is the regular variables and the LN and LAG/DIFF functions. The $2(5!/(2!*(5-2)!))$ portion is for the interacting variables X1*X2 and LN(X1*X2) portion.

FIG. 02 illustrates the sample code required to generate the combinations and permutations required to run the analysis for the detailed enumeration procedure. The previous few paragraphs detail the quick heuristics algorithm whereas FIG. 2 illustrates the computation of the detailed enumeration procedure. It illustrates an example of 7 independent X variables, where a total of over 4 million model permutations and combinations will be generated using this algorithm. Instead of listing out all possible combinations for multiple X variables, we detail the algorithm in this figure.

FIG. 03 illustrates the detailed enumeration procedure 010 in a graphical manner. The user's selected or pasted data is loaded into memory 011 such that the algorithm can run quickly in a virtual environment. The data is first checked for its validity and integrity 012 by looking at various issues such as micronumerosity 013 where the number of independent variables generated exceeds the total number of rows of data, creating an error in the procedure, or multicollinearity 014, where the independent variables are highly correlated to one another, returning an error in the regression analysis model. The data is also checked for any alphanumerical 015 inputs or missing or invalid data 016. If the data passes all these checks, it will be entered into memory 017 for the next step in the process. Using the data, the algorithm determines how many independent variables exist and initiates the generation of all the unique intermediate variables 018 such as the natural logarithm, the first difference, lagged values, and so forth. The C++ source code is then run 019 to enumerate in detail, all possible combinations and permutations of models required, the unique variables in these enumerated models 020 are then identified and matched against the list generated previously and the actual data of these revised variables are computed 021 and stored in temporary memory 022. Each of the enumerated model is then run 023 where each of the unique model's results are stored in memory 024 and the running list of best models is maintained in memory 025. This list of best model is selected based on two criteria, the first is that all models are selected and ranked based on the adjusted R-square or regular R-square coefficient 026, second is that all of the variables' p-values have to be below the user threshold 027. At the end of running all combinations and permutations of models, the list of best models 028 is shown and ranked by the adjusted R-square or regular R-square 029 and the detailed regression analysis results are shown for these best models 030.

Figure 4:
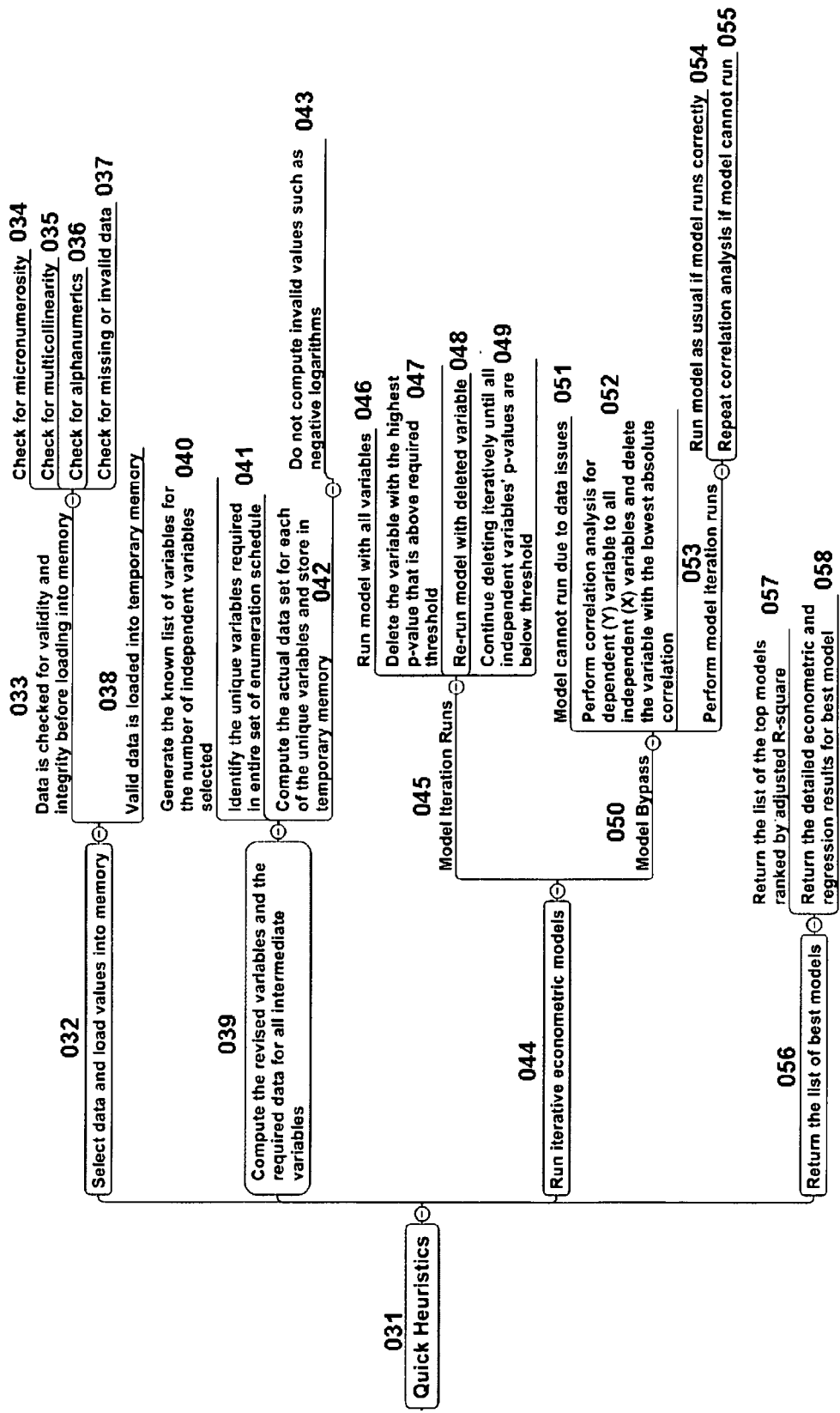
FIG. 04 illustrates the quick heuristics approach where a smart search business process is employed in place of the detailed enumeration procedure. Using this process, fewer models will be tested and the algorithm will run a lot faster, illustrated as a mind map, indicating all of the branched processes.

FIG. 04 illustrates the quick heuristics procedure 031 in a graphical manner. The user's selected or pasted data is loaded into memory 032 such that the algorithm can run quickly in a virtual environment. Like in the detailed enumeration procedure, the data is first checked for its validity and integrity 033 by looking at various issues such as micronumerosity 034 where the number of independent variables generated exceeds the total number of rows of data, creating an error in the procedure, or multicollinearity 035, where the independent variables are highly correlated to one another, returning an error in the regression analysis model. The data is also checked for any alphanumerical 036 inputs or missing or invalid data 037. If the data passes all these checks, it will be entered into memory 038 for the next step in the process. Using the data, the algorithm determines how many independent variables exist and initiates the generation of all the unique intermediate variables 039 such as the natural logarithm, the first difference, lagged values, and so forth. Using a separate C++ source code, we generate a list of known intermediate variables 040 to run in the quick heuristics procedure, and the unique variables in these quick heuristics models 041 are then identified and matched against the list generated previously and the actual data of these revised variables are computed 042 and stored in temporary memory, whereas invalid variables such as negative logarithms or invalid results are skipped and not computed 043. Each of the quick heuristics models is then run 044. The model iteration runs 045 initiates by running all of the heuristically generated intermediate variables 046, then the variable with the highest p-value that is above the required threshold is then deleted 047 from the list, and the model is then re-run 048. This process continues iteratively until all of the independent variables' p-values are below the required threshold 049. If for some reason multicollinearity exists, we create a model bypass 050 whereby the model that cannot be run due to data issues 051 is stopped, and all of the independent variables are then correlated to the single dependent variable, and the independent variable with the lowest absolute value of its correlation coefficient is deleted from the list 052 and the model is then re-run. If the model runs as usual 053, we revert back to the regular iteration run 054, but if this new model again cannot run, we repeat the correlation analysis procedure 055 until such a time when the model runs again. Each of the unique model's results are stored in memory and the running list of best models is maintained in memory 056. This list of best model is selected based on two criteria, the first is that all models are selected and ranked based on the adjusted R-square or regular R-square coefficient 057, second is that all of the variables' p-values have to be below the user threshold. At the end of running all combinations and permutations of models, the list of best models 058 is shown and ranked by the adjusted R-square or regular R-square and the detailed regression analysis results are shown for the best model 058.

FIG. 05 illustrates a sample set of results 059 from a run using the detailed enumeration and quick heuristics approach. The results show the list of the best models after the detailed run. It starts by summarizing the R-square or adjusted R-square coefficient as well as the intermediate independent variables used to generate the model. Then, the report continues with the details of the regression analysis for each of the best models.

FIG. 06 illustrates the report 060 of the best-fitting model from both the detailed enumeration and quick heuristics procedure. Just like in the detailed enumeration procedure, the details of the regression analysis run are provided at the end of the run.

Figure 7:
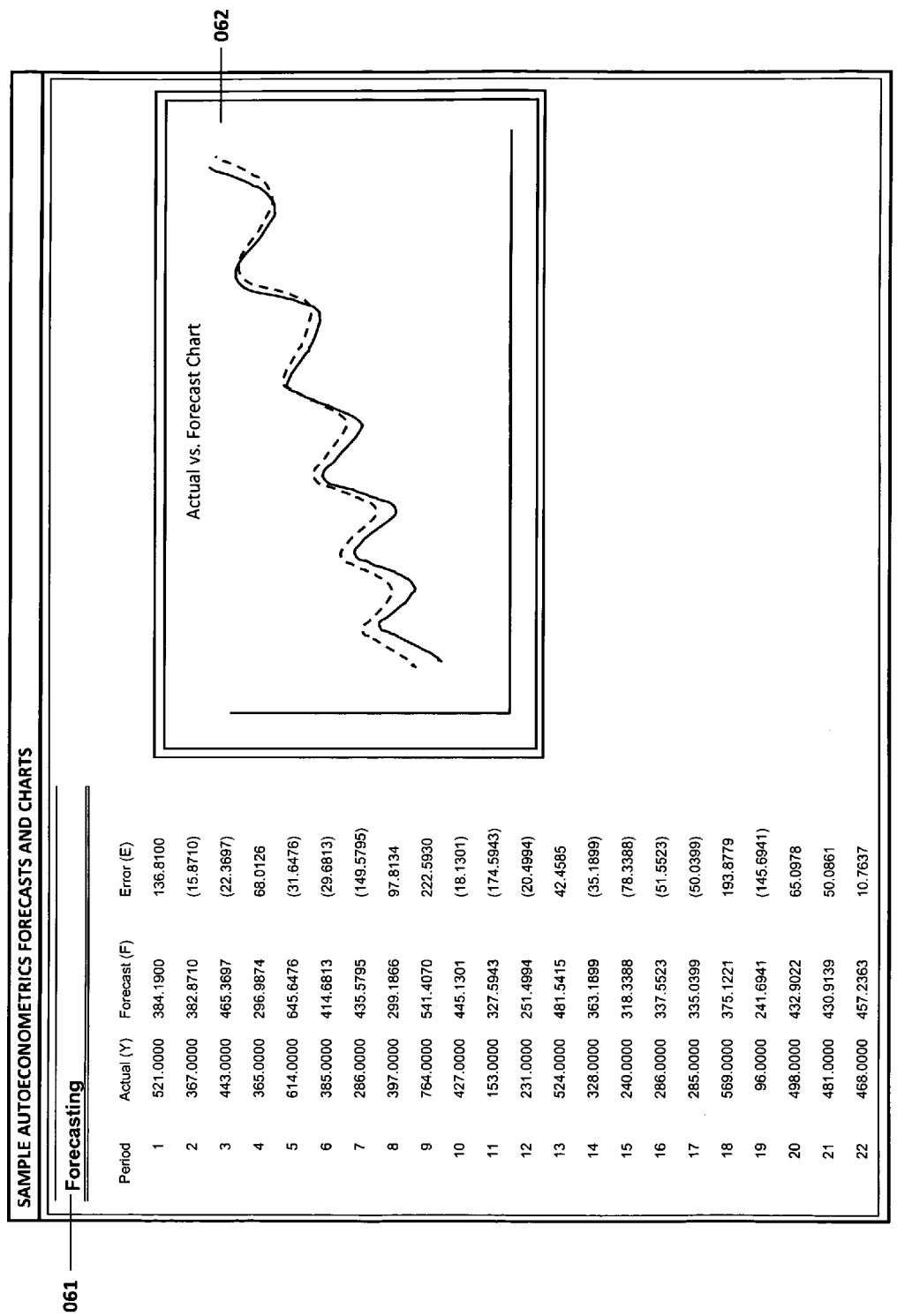
FIG. 07 illustrates the forecast results and charts generated from the best-fitting model.

FIG. 07 illustrates the forecast results 061 and charts 062 of the forecast to actual data using the detailed enumeration and quick heuristics procedures.

Multiple Regression Analysis and Econometric Data Analysis

This section demonstrates the mathematical models and computations used in creating the general regression equations, which take the form of $Y=\beta_0+\beta_1X_1+\beta_2X_2+\ldots+\beta_nX_n+\epsilon$ where $\beta_0$ is the intercept, $\beta i$ are the slope coefficients, and $\epsilon$ is the error term. The Y term is the dependent variable and the X terms are the independent variables, where these X variables are also known as the regressors. The dependent variable is named as such as it depends on the independent variable, for example, sales revenue depends on the amount of marketing costs expended on a product's advertising and promotion, making the dependent variable sales and the independent variable marketing costs. An example of a bivariate regression where there is only a single Y and a single X variable, is seen as simply inserting the best-fitting line through a set of data points in a two-dimensional plane. In other cases, a multivariate regression can be performed, where there are multiple or k number of independent X variables or regressors where in this case, the best-fitting line will be within a k+1 dimensional plane.

Fitting a line through a set of data points in a multidimensional scatter plot may result in numerous possible lines. The best-fitting line is defined as the single unique line that minimizes the total vertical errors, that is, the sum of the absolute distances between the actual data points ($Y_i$) and the estimated line ($\hat{Y}$). To find the best-fitting unique line that minimizes the errors, a more sophisticated approach is applied, using multivariate regression analysis. Regression analysis therefore finds the unique best-fitting line by requiring that the total errors be minimized, or by calculating $$\text{Min}\sum_{i=1}^{n}(Y_i - \hat{Y}_i)^2$$

Only one unique line will minimize this sum of squared errors as shown in the equation above. The errors (vertical distances between the actual data and the predicted line) are squared to avoid the negative errors from canceling out the positive errors. Solving this minimization problem with respect to the slope and intercept requires calculating first derivatives and setting them equal to zero:

$$\frac{d}{d\beta_0}\sum_{i=1}^{n}(Y_i - \hat{Y}_i)^2 = 0$$

and $$\frac{d}{d\beta_1}\sum_{i=1}^{n}(Y_i - \hat{Y}_i)^2 = 0$$

Which yields the simple bivariate regression's set of least squares equations:

$$\beta_1 = \frac{\sum_{i=1}^{n}(X_i - \overline{X})(Y_i - \overline{Y})}{\sum_{i=1}^{n}(X_i - \overline{X})^2} = \frac{\sum_{i=1}^{n}X_iY_i - \frac{\sum_{i=1}^{n}X_i\sum_{i=1}^{n}Y_i}{n}}{\sum_{i=1}^{n}X_i^2 - \frac{\left(\sum_{i=1}^{n}X_i\right)^2}{n}}$$

$$\beta_0 = \overline{Y} - \beta_1\overline{X}$$

For multivariate regression, the analogy is expanded to account for multiple independent variables, where $Y_i=\beta_1+\beta_2X_{2,i}+\beta_3X_{3,i}+\epsilon_i$ and the estimated slopes can be calculated by:

$$\hat{\beta}_2 = \frac{\sum Y_iX_{2,i}\sum X_{3,i}^2 - \sum Y_iX_{3,i}\sum X_{2,i}X_{3,i}}{\sum X_{2,i}^2 \sum X_{3,i}^2 - (\sum X_{2,i}X_{3,i})^2}$$

$$\hat{\beta}_3 = \frac{\sum Y_iX_{3,i}\sum X_{2,i}^2 - \sum Y_iX_{2,i}\sum X_{2,i}X_{3,i}}{\sum X_{2,i}^2 \sum X_{3,i}^2 - (\sum X_{2,i}X_{3,i})^2}$$

This set of results can be summarized using matrix notations: $[X'X]^{-1}[X'Y]$.

In running multivariate regressions, great care must be taken to set up and interpret the results. For instance, a good understanding of econometric modeling is required (e.g., identifying regression pitfalls such as structural breaks, multicollinearity, heteroskedasticity, autocorrelation, specification tests, nonlinearities, and so forth) before a proper model can be constructed. Therefore the present invention includes some advanced econometrics approaches that are based on the principles of multiple regression outlined above.

One approach used is that of an Auto-ARIMA, which is based on the fundamental concepts of ARIMA theory or Autoregressive Integrated Moving Average models. ARIMA (p,d,q) models are the extension of the AR model that uses three components for modeling the serial correlation in the time series data. The first component is the autoregressive (AR) term. The AR(p) model uses the p lags of the time series in the equation. An AR(p) model has the form: $y_t=a_1y_{t-1}+\ldots+a_py_{t-p}+e_t$. The second component is the integration (d) order term. Each integration order corresponds to differencing the time series. I(1) means differencing the data once. I(d) means differencing the data d times. The third component is the moving average (MA) term. The MA(q) model uses the q lags of the forecast errors to improve the forecast. An MA(q) model has the form: $y_t=e_t+b_1e_{t-1}+\ldots+b_qe_{t-q}$. Finally, an ARMA(p,q) model has the combined form: $y_t=a_1y_{t-1}+\ldots+a_py_{t-p}+e_t+b_1e_{t-1}+\ldots+b_qe_{t-q}$. Using this ARIMA concept, various combinations of p, d, q integers are tested in an automated and systematic fashion to determine the best-fitting model for the user's data.

In order to determine the best fitting model, we apply several goodness-of-fit statistics to provide a glimpse into the accuracy and reliability of the estimated regression model. They usually take the form of a t-statistic, F-statistic, R-squared statistic, adjusted R-squared statistic, Durbin-Watson statistic, Akaike Criterion, Schwarz Criterion, and their respective probabilities.

The R-squared ($R^2$), or coefficient of determination, is an error measurement that looks at the percent variation of the dependent variable that can be explained by the variation in the independent variable for a regression analysis. The coefficient of determination can be calculated by:

$$R^2 = 1 - \frac{\sum_{i=1}^{n}(Y_i - \hat{Y}_i)^2}{\sum_{i=1}^{n}(Y_i - \overline{Y})^2} = 1 - \frac{SSE}{TSS}$$

Where the coefficient of determination is one less the ratio of the sums of squares of the errors (SSE) to the total sums of squares (TSS). In other words, the ratio of SSE to TSS is the unexplained portion of the analysis, thus, one less the ratio of SSE to TSS is the explained portion of the regression analysis.

The estimated regression line is characterized by a series of predicted values ($\hat{Y}$); the average value of the dependent variable's data points is denoted $\overline{Y}$; and the individual data points are characterized by $Y_i$. Therefore, the total sum of squares, that is, the total variation in the data or the total variation about the average dependent value, is the total of the difference between the individual dependent values and its average (the total squared distance of $Y_i - \overline{Y}$). The explained sum of squares, the portion that is captured by the regression analysis, is the total of the difference between the regression's predicted value and the average dependent variable's data set (seen as the total squared distance of $\hat{Y} - \overline{Y}$). The difference between the total variation (TSS) and the explained variation (ESS) is the unexplained sums of squares, also known as the sums of squares of the errors (SSE).

Another related statistic, the adjusted coefficient of determination, or the adjusted R-squared ($\overline{R}^2$), corrects for the number of independent variables (k) in a multivariate regression through a degrees of freedom correction to provide a more conservative estimate:

$$\overline{R}^2 = 1 - \frac{\sum_{i=1}^{n}(Y_i - \hat{Y}_i)^2/(k-2)}{\sum_{i=1}^{n}(Y_i - \overline{Y})^2/(k-1)} = 1 - \frac{SSE/(k-2)}{TSS/(k-1)}$$

The adjusted R-squared should be used instead of the regular R-squared in multivariate regressions because every time an independent variable is added into the regression analysis, the R-squared will increase; indicating that the percent variation explained has increased. This increase occurs even when nonsensical regressors are added. The adjusted R-squared takes the added regressors into account and penalizes the regression accordingly, providing a much better estimate of a regression model's goodness-of-fit. Other goodness-of-fit statistics include the t-statistic and the F-statistic. The former is used to test if each of the estimated slope and intercept(s) is statistically significant, that is, if it is statistically significantly different from zero (therefore making sure that the intercept and slope estimates are statistically valid). The latter applies the same concepts but simultaneously for the entire regression equation including the intercept and slopes. Using the previous example, the following illustrates how the t-statistic and F-statistic can be used in a regression analysis.

When running the Autoeconometrics methodology, multiple regression issues and errors are first tested for. These include items such as heteroskedasticity, multicollinearity, micronumerosity, lags, leads, autocorrelation and others. For instance, several tests exist to test for the presence of heteroskedasticity. These tests also are applicable for testing misspecifications and nonlinearities. The simplest approach is to graphically represent each independent variable against the dependent variable as illustrated earlier. Another approach is to apply one of the most widely used model, the White's test, where the test is based on the null hypothesis of no heteroskedasticity against an alternate hypothesis of heteroskedasticity of some unknown general form. The test statistic is computed by an auxiliary or secondary regression, where the squared residuals or errors from the first regression are regressed on all possible (and nonredundant) cross products of the regressors. For example, suppose the following regression is estimated:

$$Y = \beta_0 + \beta_1 X + \beta_2 Z + \epsilon_t$$

The test statistic is then based on the auxiliary regression of the errors ($\epsilon$):

$$\epsilon_t^2 = \alpha_0 + \alpha_1 X + \alpha_2 Z + \alpha_3 X^2 + \alpha_4 Z^2 + \alpha_5 XZ + v_t$$

The $nR^2$ statistic is the White's test statistic, computed as the number of observations (n) times the centered R-squared from the test regression. White's test statistic is asymptotically distributed as a $\chi^2$ with degrees of freedom equal to the number of independent variables (excluding the constant) in the test regression.

The White's test is also a general test for model misspecification, because the null hypothesis underlying the test assumes that the errors are both homoskedastic and independent of the regressors, and that the linear specification of the model is correct. Failure of any one of these conditions could lead to a significant test statistic. Conversely, a nonsignificant test statistic implies that none of the three conditions is violated. For instance, the resulting F-statistic is an omitted variable test for the joint significance of all cross products, excluding the constant. One method to fix heteroskedasticity is to make it homoskedastic by using a weighted least squares (WLS) approach. For instance, suppose the following is the original regression equation:

$$Y = \beta_0 + \beta_1 X_1 + \beta_2 X_2 + \beta_3 X_3 + \epsilon$$

Further suppose that $X_2$ is heteroskedastic. Then transform the data used in the regression into:

$$Y = \frac{\beta_0}{X_2} + \beta_1 \frac{X_1}{X_2} + \beta_2 + \beta_3 \frac{X_3}{X_2} + \frac{\varepsilon}{X_2}$$

The model can be redefined as the following WLS regression:

$$Y_{WLS} = \beta_0^{WLS} + \beta_1^{WLS} X_1 + \beta_2^{WLS} X_2 + \beta_3^{WLS} X_3 + v$$

Alternatively, the Park's test can be applied to test for heteroskedasticity and to fix it. The Park's test model is based on the original regression equation, uses its errors, and creates an auxiliary regression that takes the form of:

$$\ln e_i^2 = \beta_1 + \beta_2 \ln X_{k,i}$$

Suppose $\beta_2$ is found to be statistically significant based on a t-test, then heteroskedasticity is found to be present in the variable $X_{k,i}$. The remedy therefore is to use the following regression specification:

$$\frac{Y}{\sqrt{X_k^{\beta_2}}} = \frac{\beta_1}{\sqrt{X_k^{\beta_2}}} + \frac{\beta_2 X_2}{\sqrt{X_k^{\beta_2}}} + \frac{\beta_3 X_3}{\sqrt{X_k^{\beta_2}}} + \varepsilon.$$

Multicollinearity exists when there is a linear relationship between the independent variables. When this occurs, the regression equation cannot be estimated at all. In near collinearity situations, the estimated regression equation will be biased and provide inaccurate results. This situation is especially true when a step-wise regression approach is used, where the statistically significant independent variables will be thrown out of the regression mix earlier than expected, resulting in a regression equation that is neither efficient nor accurate. As an example, suppose the following multiple regression analysis exists, where $$Y_i = \beta_1 + \beta_2 X_{2,i} + \beta_2 X_{3,i} + \epsilon_i$$

The estimated slopes can be calculated through $$\hat{\beta}_2 = \frac{\sum Y_i X_{2,i} \sum X_{3,i}^2 - \sum Y_i X_{3,i} \sum X_{2,i} X_{3,i}}{\sum X_{2,i}^2 \sum X_{3,i}^2 - (\sum X_{2,i} X_{3,i})^2}$$

$$\hat{\beta}_3 = \frac{\sum Y_i X_{3,i} \sum X_{2,i}^2 - \sum Y_i X_{2,i} \sum X_{2,i} X_{3,i}}{\sum X_{2,i}^2 \sum X_{3,i}^2 - (\sum X_{2,i} X_{3,i})^2}$$

Now suppose that there is perfect multicollinearity, that is, there exists a perfect linear relationship between $X_2$ and $X_3$, such that $X_{3,i} = \lambda X_{2,i}$ for all positive values of $\lambda$. Substituting this linear relationship into the slope calculations for $\beta_2$, the result is indeterminate. In other words, we have $$\hat{\beta}_2 = \frac{\sum Y_i X_{2,i} \sum \lambda^2 X_{2,i}^2 - \sum Y_i \lambda X_{2,i} \sum \lambda X_{2,i}^2}{\sum X_{2,i}^2 \sum \lambda^2 X_{2,i}^2 - (\sum \lambda X_{2,i}^2)^2} = \frac{0}{0}$$

The same calculation and results apply to $\beta_3$, which means that the multiple regression analysis breaks down and cannot be estimated given a perfect collinearity condition. One quick test of the presence of multicollinearity in a multiple regression equation is that the R-squared value is relatively high while the t-statistics are relatively low. Another quick test is to create a correlation matrix between the independent variables. A high cross correlation indicates a potential for multicollinearity. The rule of thumb is that a correlation with an absolute value greater than 0.75 is indicative of severe multicollinearity.

Another test for multicollinearity is the use of the variance inflation factor (VIF), obtained by regressing each independent variable to all the other independent variables, obtaining the R-squared value and calculating the VIF of that variable by estimating:

$$VIF_i = \frac{1}{(1 - R_i^2)}$$

A high VIF value indicates a high R-squared near unity. As a rule of thumb, a VIF value greater than 10 is usually indicative of destructive multicollinearity. The Autoeconometrics method computes for multicollinearity and corrects the data before running the next iteration when enumerating through the entire set of possible combinations and permutations of models.

One very simple approach to test for autocorrelation is to graph the time series of a regression equation's residuals. If these residuals exhibit some cyclicality, then autocorrelation exists. Another more robust approach to detect autocorrelation is the use of the Durbin-Watson statistic, which estimates the potential for a first-order autocorrelation. The Durbin-Watson test also identifies model misspecification. That is, if a particular time-series variable is correlated to itself one period prior. Many time-series data tend to be autocorrelated to their historical occurrences. This relationship can be due to multiple reasons, including the variables' spatial relationships (similar time and space), prolonged economic shocks and events, psychological inertia, smoothing, seasonal adjustments of the data, and so forth.

The Durbin-Watson statistic is estimated by the sum of the squares of the regression errors for one period prior, to the sum of the current period's errors:

$$DW = \frac{\sum (\varepsilon_t - \varepsilon_{t-1})^2}{\sum \varepsilon_t^2}$$

There is a Durbin-Watson critical statistic table at the end of the book that provides a guide as to whether a statistic implies any autocorrelation.

Another test for autocorrelation is the Breusch-Godfrey test, where for a regression function in the form of:

$$Y = f(X_1, X_2, \ldots, X_k)$$

Estimate this regression equation and obtain its errors $\epsilon_t$. Then, run the secondary regression function in the form of:

$$Y = f(X_1, X_2, \ldots, X_k, \epsilon_{t-1}, \epsilon_{t-1}, \epsilon_{1-p})$$

Obtain the R-squared value and test it against a null hypothesis of no autocorrelation versus an alternate hypothesis of autocorrelation, where the test statistic follows a Chi-Square distribution of p degrees of freedom:

$$R^2(n-p) \sim \chi_{df=p}^2$$

Fixing autocorrelation requires the application of advanced econometric models including the applications of ARIMA (as described above) or ECM (Error Correction Models). However, one simple fix is to take the lags of the dependent variable for the appropriate periods, add them into the regression function, and test for their significance, for instance:

$$Y_t = f(Y_{t-1}, Y_{t-2}, \ldots, Y_{t-p}, X_1, X_2, \ldots, X_k)$$

In interpreting the results of an Autoeconometrics model, most of the specifications are identical to the multivariate regression analysis. However, there are several additional sets of results specific to the econometric analysis. The first is the addition of Akaike Information Criterion (AIC) and Schwarz Criterion (SC), which are often used in ARIMA model selection and identification. That is, AIC and SC are used to determine if a particular model with a specific set of p, d, and q parameters is a good statistical fit. SC imposes a greater penalty for additional coefficients than the AIC but generally, the model with the lowest AIC and SC values should be chosen. Finally, an additional set of results called the autocorrelation (AC) and partial autocorrelation (PAC) statistics are provided in the ARIMA report.

For instance, if autocorrelation AC(1) is nonzero, it means that the series is first order serially correlated. If AC dies off more or less geometrically with increasing lags, it implies that the series follows a low-order autoregressive process. If AC drops to zero after a small number of lags, it implies that the series follows a low-order moving-average process. In contrast, PAC measures the correlation of values that are k periods apart after removing the correlation from the intervening lags. If the pattern of autocorrelation can be captured by an autoregression of order less than k, then the partial autocorrelation at lag k will be close to zero. The Ljung-Box Q-statistics and their p-values at lag k are also provided, where the null hypothesis being tested is such that there is no autocorrelation up to order k. The dotted lines in the plots of the autocorrelations are the approximate two standard error bounds. If the autocorrelation is within these bounds, it is not significantly different from zero at approximately the 5% significance level. Finding the right ARIMA model takes practice and experience. These AC, PAC, SC, and AIC are highly useful diagnostic tools to help identify the correct model specification. Finally, the ARIMA parameter results are obtained using sophisticated optimization and iterative algorithms, which means that although the functional forms look like those of a multivariate regression, they are not the same. ARIMA is a much more computationally intensive and advanced econometric approach.

I claim:

1. A non-transitory computer-readable medium that stores computer-executable instructions that are executable by a computer processor, the instructions when executed embodying a method for modeling various combinations of econometric regression analysis that comprises:

using a computer processor to store, in a non-transitory computer-readable medium, a plurality of customized and flexible financial options and a plurality of methods for autoeconometric modeling;

presenting to a user, via a software module stored on said tangible computer-readable medium, an interface for entering a dataset into a data grid;

receiving input from said user, wherein said input is comprised of an input dataset for insertion to said data grid, a threshold value and a set of one or more user selected options, wherein said one or more user selected options are comprised of one or more of a linear model, a nonlinear model, a time-series lag and an autoregressive lag, wherein said input dataset is comprised of a plurality of user provided variables;

enumerating a plurality of econometric variables from said plurality of user provided variables, wherein said plurality of econometric variables is greater in total number of variables than said plurality of user provided variables;

assigning a fitness rating for said plurality of econometric variables via analysis routines;

associating a p-value to each variable in said plurality of econometric variables;

storing only said p-values in memory;

eliminating one or more variables from said plurality of econometric variables as insignificant, wherein said one or more variables have a p-value greater than said threshold value;

reanalyzing said plurality of econometric variables via econometric analysis routines;

generating one or more final model reports;

ranking said one or more final model reports by an R-Square coefficient; and displaying said one or more final model reports in order of ranking to said user.

2. The system of claim 1, wherein said reanalyzing step utilizes a quick heuristic model.

3. The system of claim 1, wherein said R-Square is an adjusted R-Square coefficient.

4. The system non-transitory computer-readable medium of claim 1, wherein said econometric analysis include a bypass procedure.

5. The system non-transitory computer-readable medium of claim 1, wherein said econometric analysis include a linear and nonlinear routine.

6. The system non-transitory computer-readable medium of claim 1, wherein said econometric analysis include a time-series lag routine.

7. The system non-transitory computer-readable medium of claim 1, wherein said econometric analysis include an autoregressive lag routine.

8. The system non-transitory computer-readable medium of claim 1, wherein said econometric analysis include a linear & nonlinear interlacing routine.

9. A computer implemented method for modeling various combinations of variables via econometric regression analysis:

using a computer processor to store, in a non-transitory computer-readable medium, a plurality of customized and flexible financial options and a plurality of methods for autoeconometric modeling;

presenting to a user, via a software module stored on said tangible computer-readable medium, an interface for entering a dataset into a data grid;

receiving input from said user, wherein said input is comprised of an input dataset for insertion to said data grid, a threshold value and a set of one or more user selected options, wherein said one or more user selected options are comprised of one or more of a linear model, a nonlinear model, a time-series lag and an autoregressive lag, wherein said input dataset is comprised of a plurality of user provided variables;

enumerating a plurality of econometric variables from said plurality of user provided variables, wherein said plurality of econometric variables is greater in total number of variables than said plurality of user provided variables;

assigning a fitness rating for said plurality of econometric variables via econometric analysis;

associating a p-value to each variable in said plurality of econometric variables;

storing only said p-values in memory;

eliminating one or more variables from said plurality of econometric variables as insignificant, wherein said one or more variables have a p-value greater than said threshold value;

reanalyzing said plurality of econometric variables via econometric analysis;

generating one or more final model reports;

ranking said one or more final model reports by an R-Square coefficient; and displaying said one or more final model reports in order of ranking to said user.

10. The method of claim 9, wherein said reanalyzing step utilizes a quick heuristic model.

11. The method of claim 9, wherein said R-Square is an adjusted R-Square coefficient.

12. The method of claim 9, wherein said econometric analysis include a bypass procedure.

13. The method of claim 9, wherein said econometric analysis include a linear and nonlinear routine.

14. The method of claim 9, wherein said econometric analysis include a time-series lag routine.

15. The method of claim 9, wherein said econometric analysis include an autoregressive lag routine.

16. The method of claim 9, wherein said econometric analysis include a linear & nonlinear interlacing routine.

* * * * *